(12) United States Patent
DaCosta et al.

(10) Patent No.: US 8,164,573 B2
(45) Date of Patent: Apr. 24, 2012

(54) SYSTEMS AND METHODS FOR ADAPTIVE INTERPRETATION OF INPUT FROM A TOUCH-SENSITIVE INPUT DEVICE

(75) Inventors: Henry DaCosta, Montreal (CA); Christophe Ramstein, San Francisco, CA (US); Danny Grant, Montreal (CA)

(73) Assignee: Immersion Corporation, San Jose, CA (US)

( * ) Notice: Subject to any disclaimer, the term of this patent is extended or adjusted under 35 U.S.C. 154(b) by 1560 days.

(21) Appl. No.: 10/723,778

(22) Filed: Nov. 26, 2003

(65) Prior Publication Data

US 2005/0110769 A1 May 26, 2005

(51) Int. Cl.
*G09G 5/00* (2006.01)
(52) U.S. Cl. ..................... 345/173; 178/18.01
(58) Field of Classification Search .......... 345/156–163, 345/168, 169, 173–179; 178/18.1, 18.01, 178/18.03–18.09; 715/701, 702
See application file for complete search history.

(56) References Cited

U.S. PATENT DOCUMENTS

| | | | |
|---|---|---|---|
| 2,972,140 A | 2/1961 | Hirsch | |
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,623,064 A | 11/1971 | Kagan | |
| 3,902,687 A | 9/1975 | Hightower | |
| 3,903,614 A | 9/1975 | Diamond et al. | |
| 3,911,416 A | 10/1975 | Feder | |
| 4,127,752 A | 11/1978 | Lowthorp | |
| 4,160,508 A | 7/1979 | Frosch et al. | |
| 4,236,325 A | 12/1980 | Hall et al. | |
| 4,262,549 A | 4/1981 | Schwellenbach | |
| 4,333,070 A | 6/1982 | Barnes | |
| 4,464,117 A | 8/1984 | Forest | |
| 4,484,191 A | 11/1984 | Vavra | |

(Continued)

FOREIGN PATENT DOCUMENTS

EP 0349086 1/1990

(Continued)

OTHER PUBLICATIONS

PCT Search Report, corresponding to PCT/US04/24358, mailed on Feb. 11, 2005.

(Continued)

*Primary Examiner* — Regina Liang
(74) *Attorney, Agent, or Firm* — Kilpatrick Townsend & Stockton LLP (57) ABSTRACT

Systems and methods for adaptively interpreting a user's intent based on parameters supplied by a touch-sensitive input device are described. In one of the methods described, a processor receives a pressure signal indicating a pressure from an input device, such as a touchpad, compares the pseudo pressure signal to a pressure threshold value, and outputs a signal if the pseudo pressure signal is greater than the pressure threshold value. In another embodiment, the processor also calculates the speed of movement of a conductor, for instance a user's finger, across the input device, and compares the speed to a threshold. If the speed is greater than the threshold, the processor determines that although the pressure may be great enough to signal a press, no press is intended. The various parameters supplied by the input device may be digitally filtered to increase the accuracy of the determination of user intent.

26 Claims, 4 Drawing Sheets

U.S. PATENT DOCUMENTS

| | | |
|---|---|---|
| 4,513,235 A | 4/1985 | Acklam et al. |
| 4,581,491 A | 4/1986 | Boothroyd |
| 4,599,070 A | 7/1986 | Hladky et al. |
| 4,708,656 A | 11/1987 | De Vries et al. |
| 4,713,007 A | 12/1987 | Alban |
| 4,758,165 A | 7/1988 | Tieman et al. |
| 4,772,205 A | 9/1988 | Chlumsky et al. |
| 4,794,392 A | 12/1988 | Selinko |
| 4,885,565 A | 12/1989 | Embach |
| 4,891,764 A | 1/1990 | McIntosh |
| 4,926,879 A | 5/1990 | Sevrain et al. |
| 4,930,770 A | 6/1990 | Baker |
| 4,934,694 A | 6/1990 | McIntosh |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin |
| 5,038,089 A | 8/1991 | Szakaly |
| 5,078,152 A | 1/1992 | Bond |
| 5,121,091 A | 6/1992 | Fujiyama |
| 5,159,159 A | 10/1992 | Asher |
| 5,165,897 A | 11/1992 | Johnson |
| 5,175,459 A | 12/1992 | Danial et al. |
| 5,186,695 A | 2/1993 | Mangseth et al. |
| 5,212,473 A | 5/1993 | Louis |
| 5,240,417 A | 8/1993 | Smithson et al. |
| 5,271,290 A | 12/1993 | Fischer |
| 5,275,174 A | 1/1994 | Cook |
| 5,283,970 A | 2/1994 | Aigner |
| 5,299,810 A | 4/1994 | Pierce |
| 5,302,132 A | 4/1994 | Corder |
| 5,309,140 A | 5/1994 | Everett, Jr. et al. |
| 5,334,027 A | 8/1994 | Wherlock |
| 5,389,849 A | 2/1995 | Asano et al. |
| 5,436,622 A | 7/1995 | Gutman et al. |
| 5,437,607 A | 8/1995 | Taylor |
| 5,461,711 A | 10/1995 | Wang et al. |
| 5,466,213 A | 11/1995 | Hogan |
| 5,488,204 A | 1/1996 | Mead |
| 5,547,382 A | 8/1996 | Yamasaki |
| 5,575,761 A | 11/1996 | Hajianpour |
| 5,600,777 A | 2/1997 | Wang et al. |
| 5,613,137 A | 3/1997 | Bertram et al. |
| 5,627,567 A | 5/1997 | Davidson |
| 5,638,060 A | 6/1997 | Kataoka et al. |
| 5,719,561 A | 2/1998 | Gonzales |
| 5,736,978 A | 4/1998 | Hasser et al. |
| 5,766,016 A | 6/1998 | Slnclair |
| 5,785,630 A | 7/1998 | Bobick et al. |
| 5,880,411 A | 3/1999 | Gillespie et al. |
| 5,887,995 A | 3/1999 | Holehan |
| 5,889,511 A | 3/1999 | Ong |
| 5,917,906 A | 6/1999 | Thronton |
| 5,977,867 A | 11/1999 | Blouin |
| 5,995,084 A | 11/1999 | Chan et al. |
| 6,008,800 A | 12/1999 | Pryor |
| 6,057,830 A | 5/2000 | Chan et al. |
| 6,067,081 A | 5/2000 | Hahlganss et al. |
| 6,081,536 A | 6/2000 | Gorsuch et al. |
| 6,111,577 A | 8/2000 | Zilles et al. |
| 6,118,435 A | 9/2000 | Fujita et al. |
| 6,128,007 A * | 10/2000 | Seybold ............ 345/179 |
| 6,140,987 A | 10/2000 | Stein et al. |
| 6,151,332 A | 11/2000 | Gorsuch et al. |
| 6,160,489 A | 12/2000 | Perry et al. |
| 6,198,206 B1 | 3/2001 | Saarmaa et al. |
| 6,215,478 B1 | 4/2001 | Yeh et al. |
| 6,215,778 B1 | 4/2001 | Lomp et al. |
| 6,218,966 B1 | 4/2001 | Goodwin et al. |
| 6,219,034 B1 | 4/2001 | Elbing et al. |
| 6,236,647 B1 | 5/2001 | Amalfitano |
| 6,243,080 B1 | 6/2001 | Molne |
| 6,262,717 B1 | 7/2001 | Donohue et al. |
| 6,307,465 B1 | 10/2001 | Kayma et al. |
| 6,326,901 B1 | 12/2001 | Gonzales |
| 6,337,678 B1 | 1/2002 | Fish |
| 6,373,463 B1 | 4/2002 | Beeks |
| 6,380,931 B1 | 4/2002 | Gillespie et al. |
| 6,388,655 B1 | 5/2002 | Leung |
| 6,388,999 B1 | 5/2002 | Gorsuch et al. |
| 6,414,671 B1 | 7/2002 | Gillespie et al. |
| 6,414,674 B1 | 7/2002 | Kamper et al. |
| 6,422,941 B1 | 7/2002 | Thorner et al. |
| 6,424,338 B1 | 7/2002 | Anderson |
| 6,429,846 B2 | 8/2002 | Rosenberg et al. |
| 6,445,284 B1 | 9/2002 | Cruz-Hernandez et al. |
| 6,469,695 B1 | 10/2002 | White |
| 6,487,421 B2 | 11/2002 | Hess et al. |
| 6,492,979 B1 * | 12/2002 | Kent et al. ............ 345/173 |
| 6,509,847 B1 * | 1/2003 | Anderson ............ 341/34 |
| 6,509,892 B1 | 1/2003 | Kamper et al. |
| 6,518,958 B1 | 2/2003 | Miyajima et al. |
| 6,535,201 B1 | 3/2003 | Cooper et al. |
| 6,590,568 B1 * | 7/2003 | Astala et al. ............ 345/173 |
| 6,610,917 B2 | 8/2003 | Ludwig |
| 6,610,936 B2 | 8/2003 | Gillespie |
| 6,628,195 B1 | 9/2003 | Coudon |
| 6,636,202 B2 | 10/2003 | Ishmael, Jr. et al. |
| 6,639,582 B1 | 10/2003 | Shrader |
| 6,647,145 B1 | 11/2003 | Gay |
| 6,801,191 B2 * | 10/2004 | Mukai et al. ............ 345/179 |
| 7,046,235 B2 | 5/2006 | Katoh |
| 2001/0035854 A1 | 11/2001 | Rosenberg et al. |
| 2002/0033795 A1 | 3/2002 | Shahoian et al. |
| 2002/0149561 A1 | 10/2002 | Fukumoto et al. |
| 2002/0149570 A1 | 10/2002 | Knowles et al. |
| 2002/0156807 A1 | 10/2002 | Dieberger |
| 2003/0006892 A1 | 1/2003 | Church |
| 2003/0016211 A1 | 1/2003 | Woolley |
| 2003/0022701 A1 | 1/2003 | Gupta |
| 2003/0025679 A1 | 2/2003 | Taylor et al. |
| 2003/0030628 A1 | 2/2003 | Sato et al. |
| 2003/0038776 A1 | 2/2003 | Rosenberg et al. |
| 2003/0048260 A1 | 3/2003 | Matusis |
| 2003/0058265 A1 | 3/2003 | Robinson et al. |
| 2003/0063073 A1 * | 4/2003 | Geaghan et al. ............ 345/173 |
| 2003/0067449 A1 | 4/2003 | Yoshikawa et al. |
| 2003/0071795 A1 | 4/2003 | Baldauf et al. |
| 2003/0095105 A1 | 5/2003 | Vaananen |
| 2003/0128191 A1 | 7/2003 | Strasser et al. |
| 2003/0128192 A1 | 7/2003 | van Os |
| 2003/0151597 A1 | 8/2003 | Roberts et al. |
| 2003/0174121 A1 | 9/2003 | Poupyrev et al. |
| 2003/0179190 A1 | 9/2003 | Franzen |

FOREIGN PATENT DOCUMENTS

| | | |
|---|---|---|
| EP | 0 536 715 A2 | 4/1993 |
| EP | 0556999 B1 | 5/1998 |
| EP | 1182851 A1 | 2/2002 |
| JP | 01-003664 | 7/1990 |
| JP | 02-109714 | 1/1992 |
| JP | 04-007371 | 8/1993 |
| JP | 05-193862 | 1/1995 |
| JP | 2001-350592 A | 12/2001 |
| JP | 2002-259059 A | 9/2002 |
| WO | WO 97/18546 A1 | 5/1997 |
| WO | WO 02/12991 A1 | 2/2002 |
| WO | WO 02/27645 | 4/2002 |
| WO | WO 02/31807 A1 | 4/2002 |

OTHER PUBLICATIONS

Adelstein, "A Virtual Environment System for the Study of Human Arm Tremor," Ph.D. Dissertation, Dept. of Mechanical Engineering, MIT, Jun. 1989.

Adelstein, "Design and Implementation of a Force Reflecting Manipulandum for Manual Control research," DSC—vol. 42, Advances in Robotics, Edited by H. Kazerooni, pp. 1-12, 1992.

Aukstakalnis et al., "Silicon Mirage: The Art and Science of Virtual Reality," ISBN 0-938151-82-7, pp. 129-180, 1992.

Baigrie, "Electric Control Loading—A Low Cost, High Performance Alternative," Proceedings, pp. 247-254, Nov. 6-8, 1990.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings of Fourth CISM-IFToMM, Sep. 8-12, 1981.

Bejczy, et al., "Universal Computer Control System (UCCS) for Space Telerobots," CH2413-3/87/0000/0318501.00 1987 IEEE, 1987.

Bejczy et al., "A Laboratory Breadboard System for Dual-Arm Teleoperation," SOAR '89 Workshop, JSC, Houston, TX, Jul. 25-27, 1989.

Bliss, "Optical-to-Tactile Image Conversion for the Blind," IEEE Transactions on Man-Machine Systems, vol. MMS-11, No. 1, Mar. 1970.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Calder, "Design of a Force-Feedback Touch-Introducing Actuator for Teleoperator Robot Control," Bachelor of Science Thesis, MIT, Jun. 23, 1983.

Caldwell et al., "Enhanced Tactile Feedback (Tele-Taction) Using a Multi-Functional Sensory System," 1050-4729/93, pp. 955-960, 1993.

"Cyberman Technical Specification," Logitech Cyberman SWIFT Supplement, Apr. 5, 1994.

Eberhardt et al., "OMAR—A Haptic display for speech perception by deaf and deaf-blind individuals," IEEE Virtual Reality Annual International Symposium, Seattle, WA, Sep. 18-22, 1993.

Eberhardt et al., "Including Dynamic Haptic Perception by The Hand: System Description and Some Results," DSC—vol. 55-1, Dynamic Systems and Control: vol. 1, ASME 1994.

Fukumoto, "Active Click: Tactile Feedback for Touch Panels," ACM CHI2001 Extended Abstracts, pp. 121-122, Apr. 2001.

Force Feedback Touch Panel, Represented by CSC Division, Sales Department., SIXIK Corporation, Tokyo, Japan, www.smk.co.jp.

Gobel et al., "Tactile Feedback Applied to Computer Mice," International Journal of Human-Computer Interaction, vol. 7, No. 1, pp. 1-24, 1995.

Gotow et al., " Controlled Impedance Test Apparatus for Studying Human Interpretation of Kinesthetic Feedback," WA11-11:00, pp. 332-337.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bulletin, "Mouse Ball-Actuating Device With Force and Tactile Feedback," vol. 32, No. 9B, Feb. 1990.

Iwata, "Pen-based Haptic Virtual Environment," 0-7803-1363-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Johnson, "Shape-Memory Alloy Tactile Feedback Actuator," Armstrong Aerospace Medical Research Laboratory, AAMRL-TR-90-039, Aug. 1990.

Jones et al., "A perceptual analysis of stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Kontarinis et al., "Tactile Display of Vibratory Information in Teleoperation and Virtual Environments," PRESENCE, 4(4):387-402, 1995.

Lake, "Cyberman from Logitech," GameBytes, 1994.

Marcus, "Touch Feedback in Surgery," Proceedings of Virtual Reality and Medicine The Cutting Edge, Sep. 8-11, 1994.

McAffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Patrick, "Design, Construction, and Testing of a Fingertip Tactile Display for Interaction with Virtual and Remote Environments," Master of Science Thesis, MIT, Nov. 8, 1990.

Pimentel et al., "Virtual Reality: through the new looking glass," $2^{nd}$ Edition; McGraw-Hill, ISBN 0-07-050167-X, pp. 41-202, 1994.

Rabinowitz et al., "Multidimensional tactile displays: Identification of vibratory intensity, frequency, and contactor area," Journal of The Acoustical Society of America, vol. 82, No. 4, Oct. 1987.

Russo, "The Design and Implementation of a Three Degree of Freedom Force Output Joystick," MIT Libraries Archives Aug. 14, 1990, pp. 1-131, May 1990.

Russo, "Controlling Dissipative Magnetic Particle Brakes in Force Reflective Devices," DSC—vol. 42, Advances in Robotics, pp. 63-70, ASME 1992.

Safe Flight Instruments Corporation, "Coaxial Control Shaker," Part No. C-25502, Jul. 1, 1967.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

SMK Corporation, "Multi-Functional Touch Panel, Force-Feedback Type, Developed: A Touch Panel Providing a Clicking Feeling," http://www.smk.co.jp/whatsnew_e/628csc_e.html, Sep. 30, 2002.

SMK Corporation, "Force Feedback Type Optical Touch Panel Developed," SMK Corporation Website, Oct. 30, 2002.

Snow et al., "Model-X Force-Reflecting-Hand-Controller," NT Control No. MPO-17851; 17851; JPL Case No. 5348, pp. 1-4, Jun. 15, 1989.

Stanley et al., "Computer Simulation of Interacting Dynamic Mechanical Systems Using Distributed Memory Parallel Processors," DSC—vol. 42, Advances in Robotics, pp. 55-61, ASME 1992.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Terry et al., "Tactile Feedback in a Computer Mouse," Proceedings of Fourteenth Annual Northeast Bioengineering Conference, University of New Hampshire, Mar. 10-11, 1988.

Vwiker, "Teletouch Display Development: Phase 1 Report," Technical Report 1230, Naval Ocean Systems Center, San Diego, Apr. 17, 1989.

European Patent Office, Communication, Application No. 10010754, dated Nov. 8, 2010.

European Patent Office, Communication Pursuant to Article 94(3) EPC, Application No. 04779422, dated Nov. 9, 2010.

* cited by examiner

SYSTEMS AND METHODS FOR ADAPTIVE INTERPRETATION OF INPUT FROM A TOUCH-SENSITIVE INPUT DEVICE

NOTICE OF COPYRIGHT PROTECTION

A section of the disclosure of this patent document and its figures contain material subject to copyright protection. The copyright owner has no objection to the facsimile reproduction by anyone of the patent document, but otherwise reserves all copyright rights whatsoever.

FIELD OF THE INVENTION

The present invention generally relates to receiving input from a touch-sensitive input device. This invention more particularly relates to adaptive interpretation of input received from a touch-sensitive input device.

BACKGROUND

A variety of input devices may be used to provide position and control data to programs executing on computers, cell phones, and other processor-equipped devices. These input devices include mice, trackballs, touchpads, touch screens, touch panels, and various other devices. While the mouse and trackball provide distinct control elements for performing positioning and other control actions, the touchpad combines positioning and control.

For example, a conventional mouse includes a ball or optical sensor for determining changes in position of the mouse. The mouse also includes one or more buttons for performing a control function, such as selecting a graphical representation on a screen. In these systems, a user's intent to make a positional change or provide control input is apparent to the system.

In contrast, conventional touchpads combine the position and control functionality in a way that often masks the user's intent to make a positional change to provide control input. A user moves a finger along a touchpad to reposition a cursor. A user may also perform gestures to simulate functions of the buttons of a mouse, such as drag, click, and double-click. In either case, the user's finger is in contact with the surface of the touchpad. Changes in position on the touchpad and in the pressure exerted on the surface of the touchpad must be used to determine the user's intent. Because of the variety of users that may interact with a touchpad and the variety of functions that may be performed, determining the user's intent based on a gesture on a touchpad is difficult. Variables affecting the ability of a program to determine what a user is attempting to do include the following: the physical difference between users; the different angles at which a user may place their finger while using a touchpad; the variance in pressure between different users and between the same user; the movement of the finger across the touchpad while simultaneously attempting to perform actions on the touchpad. U.S. Pat. No. 6,414,671 to Gillespie, et al. describes one conventional method for recognizing a user's gesture as a drag gesture.

Thus, a method and system are needed for accurately determining a user's intent based on data supplied by a touch-sensitive input device.

SUMMARY

An embodiment of the present invention provides systems and methods for adaptive interpretation of input received from a touch-sensitive input device by receiving a pressure signal indicating a pressure from the input device, comparing the pseudo pressure signal to an adaptive pressure threshold value, and outputting a signal if the pseudo pressure signal is greater than the adaptive pressure threshold value.

Further details and advantages of embodiments of the present invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Figure 1:
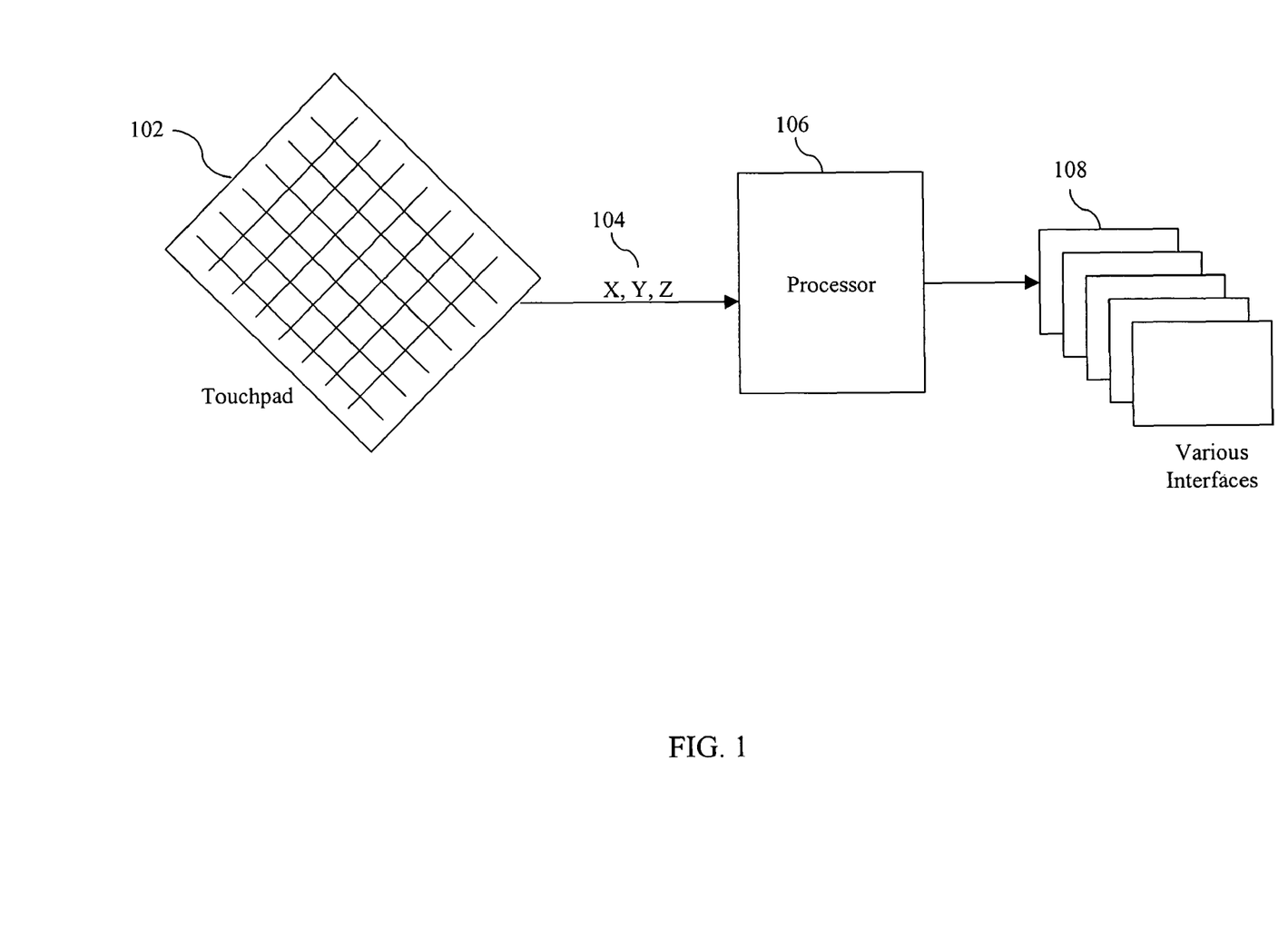
FIG. 1 illustrates an exemplary environment for implementation of one embodiment of the present invention.

Referring now to the drawings in which like numerals indicate like elements throughout the several figures, FIG. 1 illustrates an exemplary environment for implementation of an embodiment of the present invention. The embodiment shown includes a touch-sensitive device commonly called a touchpad 102. Touchpad 102 senses the position of a conductor, such as a finger, on the surface of the touchpad (102). The touchpad (102) is further able to provide a position, comprising X and Y parameters, as well as a pressure, Z parameter, as an output signal. Conventional touchpads are very accurate in determining and providing the position of the conductor. For example, some conventional touchpads have resolutions greater than 1000 dpi. However, conventional touchpads are less accurate in determining and providing the pressure exerted on the touchpad. Other embodiments of the present invention may use other touch-sensitive input devices, such as a touch panel or touch screen.

The touchpad 102 shown does not sense an actual pressure. Instead, the pressure reading from the touchpad 102 is a pseudo pressure. Touchpads work by utilizing resistance, capacitance, or membrane switches. The touchpad 102 shown in FIG. 1 utilizes capacitance, however, an embodiment of the present invention may be implemented in conjunction with any touch-sensitive input device, including resistive and membrane-switch touchpads. In other embodiments, actual pressure may be sensed. For example, in one embodiment, a touch screen with an attached explicit pressure sensor is utilized.

Capacitance-based touchpads are well known to those skilled in the art, and therefore, only a basic description of their function is provided herein. A capacitance touchpad, such as touchpad 102 shown in FIG. 1, includes two sets of wires, which are perpendicular to one another and configured so that a gap is formed between them. When a user places a conductor, such as a finger, on the touchpad 102, wires of the two perpendicular sets are brought together and form a capacitance. The touchpad 102 measures which of the wires in each of the two sets has the most capacitance to determine where the conductor is touching the touchpad 102 and, based on this information, provides the X and Y coordinates of the position of the conductor on the touchpad 102.

The touchpad 102 also provides a pseudo pressure, Z. The pseudo pressure is based on the amount of capacitance resulting from the conductor touching the touchpad 102. Accordingly, the amount of capacitance is not a direct measure of pressure but rather a pseudo pressure.

In other words, the pseudo pressure or Z parameter provided by the touchpad 102 is not a measure of the actual vertical displacement by a conductor at a single point on the touchpad 102, but rather an estimation of the vertical displacement based on the size of the capacitance change. The pseudo pressure may not accurately represent the amount of pressure actually exerted on the touchpad 102. For example, the larger the surface of the conductor used on the touchpad 102, e.g., a user's finger, the larger the change in capacitance per amount of pressure exerted. As would be expected, if a user presses heavily against the touchpad 102 with a fleshy part of the finger, the amount of touchpad 102 area covered by the finger is greater than then when the same part of the finger is touching lightly. However, what is less obvious is that the area covered, and the corresponding pseudo pressure, is also greater than when the user presses heavily with a bony part of a finger.

Additionally, the difference in the features of different conductors, for instance the size or makeup of different users' fingers, affects the capacitance change for any given change in pressure. For example, if a first user with a large finger applies the same pressure as a second user with a small finger, the pseudo pressure signal output by the touchpad 102 is greater for the first person than for the second person for the same amount of applied pressure.

The difficulty in determining a user's intent by evaluating the data provided by the touchpad 102 is compounded by the different ways in which a conductor may be utilized. For example, the pressure exerted across the surface of the touchpad may vary as the user's finger moves in relation to the hand. The user's finger covers a larger area of the touchpad when the finger is extended horizontally away from the hand on the touchpad 102 than when the finger is close to the hand. Similarly, a pointing device held vertical in relation to the touchpad 102 may cover a smaller surface area than one held at an angle to the touchpad 102.

Referring again to FIG. 1, the touchpad 102 transmits the X, Y, and Z parameters 104 to a processor 106. The touchpad 102 in various embodiments of the present invention may be capable of sending several types of coordinate information. For example, a Synaptics TouchPad is able to send either relative or absolute coordinates. Relative coordinates provide the movement of the conductor on the touchpad 102 since the last coordinates were transferred. Absolute coordinates provide the position of the conductor on the touchpad 102 at that moment. An embodiment of the present invention may utilize additional parameters as well. For example, the Synaptics TouchPad provides a "W" parameter, which reports the character of a contact with the touchpad, such as "accidental." An embodiment of the present invention may utilize such a parameter to accurately determine a user's intent.

Referring again to FIG. 1, the processor 106 and touchpad 102 may be connected directly or indirectly and may be connected via wires or a wireless connection. For example, the touchpad 102 may utilize the PS/2, Serial, Apple Desktop Bus (ADB), or other communication protocol in communicating with the processor. The processor 106 is capable of executing program code stored on a computer-readable medium. Although the processor shown is separate from the touchpad 102, some conventional touchpads include a processor, such as an Application Specific Integrated Circuit (ASIC). An ASIC may provide some processing of the movements on the touchpad 102 to determine whether or not the user is making gestures. This integrated processor may be utilized alone or in combination with the processor 106 according to the present invention.

Processor 106 may include, for example, digital logic processors capable of processing input, executing algorithms, and generating output as necessary in response to the inputs received from the touch-sensitive input device. Such processors may include a microprocessor, the aforementioned ASIC, and state machines. Such processors include, or may be in communication with, media, for example computer-readable media, which stores instructions that, when executed by the processor 106, cause the processor 106 to perform the steps described herein.

Embodiments of computer-readable media include, but are not limited to, an electronic, optical, magnetic, or other storage device capable of providing a processor, such as the processor 106 in communication with a touch-sensitive input device, with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. The instructions may comprise code from any computer-programming language, including, for example, C, C#, Visual Basic, Java, and JavaScript.

The embodiment shown in FIG. 1 may be implemented in a variety of devices. Such devices include personal computers, many of which include an integrated touchpad. Such devices may also include handheld devices, such as handheld organizers, cellular telephones, handheld communicators, MP3 players, GPS receivers, and the like.

Embodiments of the present invention may also be utilized to implement haptic effects in devices such as those mentioned above. In such an embodiment, the haptic effects result from various actions by a user interfacing with a touch-sensitive input device, and the effects may be based on the user's intent as determined by the processor 106. Haptic effects may also result from interaction with software executing on a device in communication with the touch-sensitive input device.

Embodiments of the present invention address the difficulties faced in attempting to determine the intent of a user based on the X, Y, and Z parameters supplied by the touchpad 102. Examples of determining a user's intent include determining when a user is tapping or pressing on a specific portion of a touch-sensitive input device that corresponds to a control displayed on the input device or displayed on a separate, synchronized display.

Embodiments of the present invention provide systems and methods for adaptive interpretation of the intent of a user of a touch-sensitive input device. In one embodiment of the present invention, a processor receives a pressure signal indicating a pressure from the input device, compares the pressure signal to an adaptive pressure threshold value, and outputs a signal if the pressure signal is greater than the adaptive pressure threshold value. The pressure may be a pseudo pressure or an explicit pressure. Also, the pressure may be filtered.

Embodiments of the present invention may also utilize the velocity of the conductor across the touchpad in determining a user's intent. Additionally, an embodiment may utilize adaptive thresholds alone or in combination with digital filtering to more accurately determine a user's intent.

Thresholds for pressure, pseudo pressure, pseudo-pressure change, velocity, and other measures may be stored in a computer-readable medium when the device is manufactured. Alternatively, software executed by a processor may provide settings for the thresholds. Thresholds set by software may be static or adaptive. Adaptive thresholds may rely on various parameters, including, for example, the length of time the input device has been active, the placement of the conductor on the surface of the input device, and the current user of the device.

Figure 2:
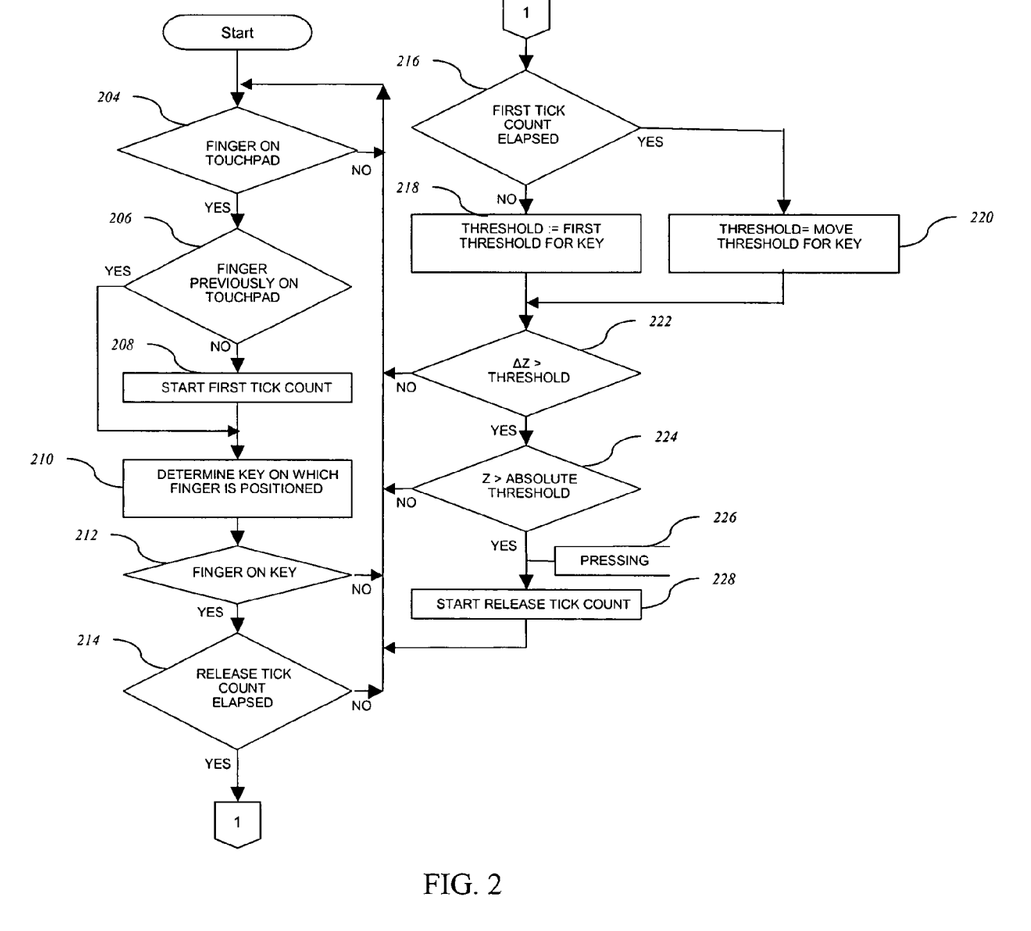
FIG. 2 is a flow chart illustrating a process or algorithm for detecting finger presses on a touchpad in one embodiment of the present invention.

FIG. 2 is a flow chart illustrating a process or algorithm for detecting and interpreting finger presses on the touchpad (102) according to the present invention. In the embodiment shown, a keypad is displayed on the touchpad (102) or on a corresponding display. In various embodiments, the keypad may be virtual or physical, and may be displayed or not displayed. A processor executing the process shown compares the pseudo pressure against a minimum threshold value and compares changes in pseudo pressure against additional minimum thresholds.

The processor (106) may use adaptive thresholds. For example, the processor (106) may utilize different threshold values based on the position of the conductor on the touchpad (102). The processor (106) may also vary the thresholds based on the specific user who is touching the touchpad (102). The processor (106) may also vary the threshold when the user initially touches the touchpad (102) to account for the large change in pseudo pressure typically encountered during initial contact. For example, in one embodiment, the processor (106) varies the thresholds during the first one-half second that a pseudo pressure is detected, because the pseudo pressure value tends to vary drastically during the first one-half second of input. The variances may be based on activity of the user or upon the passage of time. The processor (106) may update the threshold stored in memory, store a separate set of adaptive thresholds, or calculate and apply the adaptive thresholds on an ongoing basis.

In one embodiment in which an adaptive threshold is based on a specific user, the processor (106) executing the software is able to identify the user. A user identifier is stored in a computer-readable medium, and retrieved based on input received from a user, such as a user name, password, or other user identifier. Multiple user identifiers and threshold sets may be stored. The threshold may also depend on the orientation of the user's grip on a device used for pointing. For example, a stylus may incorporate a sensor to sense a user's grip orientation on the stylus.

Referring again to FIG. 2, the processor (106) executes whenever the touchpad (102) is active 202. The touchpad (102) reports data continuously to the processor (106) at approximately 80 Hz. The processor (106) receives this data and uses it to determine the user's intent based on gestures made on the touchpad (102). The processor (106) first determines whether or not a finger or other conductor is on the touchpad (102) 204. The processor (106) determines that the finger is on the touchpad (102) by evaluating the pseudo-pressure (Z) parameter. If the Z parameter is greater than zero, the user's finger is touching. If not, the algorithm repeats step 204 until a finger is detected. If a finger is on the touchpad (102), the processor (106) determines whether a finger was previously on the touchpad (102) 206. The processor (106) may accomplish this in several ways. For example, the processor (106) may store the current or previous state of the touchpad (102) in memory and from that data, deduce whether the finger was previously on the touchpad (102).

If the finger was not previously on the touchpad (102), the processor (106) starts a first tick count 208. The first tick count is used to determine the length of time the finger remains on the key and is used in other parts of the algorithm for gesture recognition. If the finger was not on the touchpad (102) or after the first tick count is started, the processor (106) determines where the finger is positioned 210. The processor (106) makes this determination based on the X and Y coordinates provided by the touchpad (102).

In the embodiment shown, the processor (106) then utilizes the coordinates to determine whether the finger is on a key 212. Each key displayed on the touchpad (102) or corresponding display is associated with numerous attributes. These attributes include characteristics of the key, such as the size, position and behavior of the key. The processor (106) determines if the finger is on the key by comparing the X and Y position data reported by the touchpad (102) to the characteristics of the key. If the finger is not on a key, the processor (106) repeats the process beginning at step 204. If the finger is on a key, the processor (106) determines whether the release tick count has elapsed 214. If the release tick count has not elapsed, then the processor (106) repeats the process beginning at step 204. If the release tick count has elapsed, the processor (106) determines whether or not the first tick count has elapsed 216.

In the embodiment shown, if the first tick count has elapsed, the threshold is set to the move threshold for the key 218. If the first tick count has not elapsed, the threshold is set to the first threshold for the key 220. The threshold value is then compared to the change in pseudo pressure 222. If the change in pseudo pressure does not exceed the threshold set in steps 218 and 220, the process repeats beginning at step 204. If the change in pseudo pressure exceeds the threshold value, the pseudo pressure, i.e., the current value of Z, is compared to an absolute threshold 224. If the pseudo pressure does not exceed the absolute threshold, the process repeats beginning at step 204. If the pseudo pressure exceeds the absolute threshold, then the processor (106) determines that the user is pressing the key 226. The processor (106) generates and sends a signal indicating that a press has been made. This signal is used by other software to control the flow of a program. For example, a word processing program may receive the signal, and in response, display a number, highlight a word, or perform some other action.

Once the determination that a press has occurred is made, the processor (106) starts the release tick count 228, and the process repeats beginning at step 204. As described above, the process continues to iterate for as long as the touchpad (102) is active.

In the process shown in FIG. 2, the first tick count is set when the finger goes from a non-touching to a touching state and is used to measure a time interval during which a different (higher) set of thresholds is used because users typically push harder when they first touch a touchpad (102). The release tick count is used to measure a time interval following the detection of a press during which the finger is deemed to be pressing. During this interval, the processor (106) does not perform further press detection. In other words, the user cannot press again if the user is already pressing and the user cannot press any faster than some predetermined rate. Once the release tick count expires, even if the user is still pressing hard, the algorithm detects a press if the user presses even harder (provided there is still room to press harder). The use of these tick counts provides for the adaptability of the algorithm.

Figure 3:
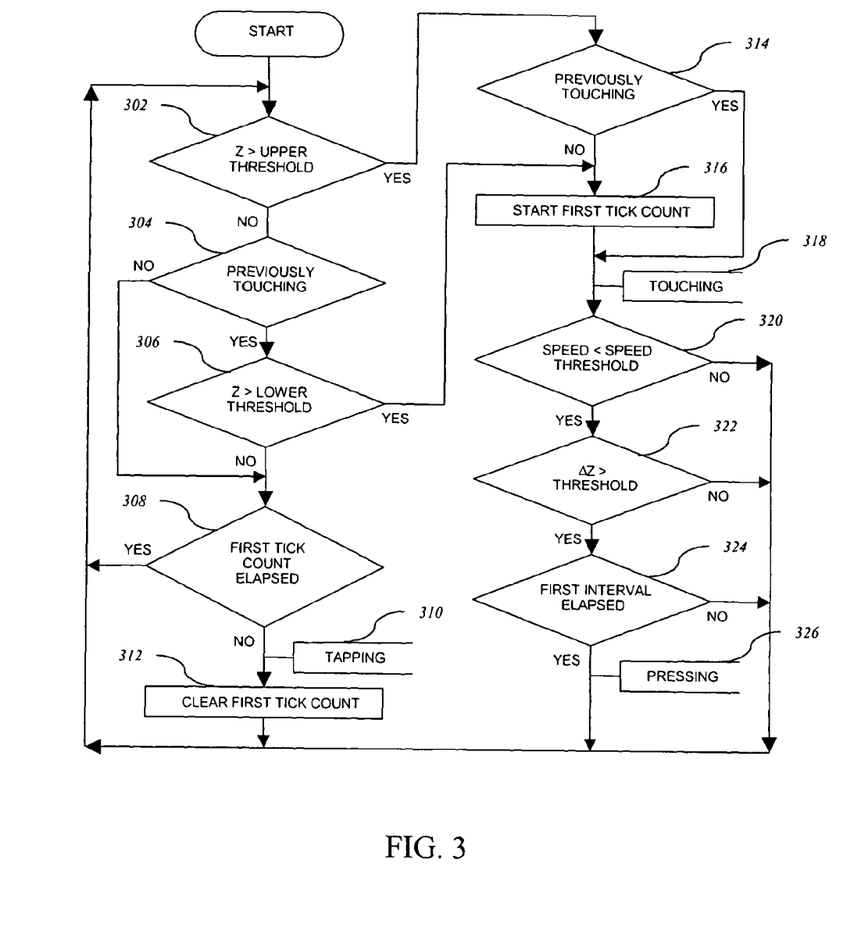
FIG. 3 is a flow chart illustrating a process for detecting a finger press on a touchpad in another embodiment of the present invention.

FIG. 3 is a flow chart illustrating another process according to the present invention for detecting a finger press on a touchpad (102). Similar to the embodiment shown in FIG. 2, in the process shown in FIG. 3, a processor (106) compares the pseudo pressure against a minimum threshold value and compares the change in pseudo pressure against a minimum threshold value. Also similar to the process above the thresholds may vary depending on where the finger touches the touchpad (102).

However, the process shown in FIG. 3 differs from the process shown in FIG. 2 in several ways. In the embodiment shown in FIG. 2, the processor (106) compares the pseudo pressure against both lower and upper thresholds to determine whether the finger is touching. If the finger was not previously touching the touchpad (102), the processor (106) requires that the pseudo pressure exceed the upper threshold before the processor (106) can conclude that the finger is currently touching the touchpad (102). If the finger was previously touching the touchpad (102), the processor (106) requires that the pseudo pressure fall below the lower threshold before concluding that the finger is not touching the touchpad (102). Also, in the embodiment shown in FIG. 3, the change in pseudo pressure is digitally filtered to reduce the effects of unwanted noise, which results from extraneous contact with the touchpad (102), such as sliding of a finger.

One digital filter useful in an embodiment of the present invention comprises software executing on a processor (106), such as a digital signal processor (DSP), to receive samples of data sent from a device, perform a numerical calculation on the data received, and provide the filtered data as output. The digital filter is programmable, allowing some signals to pass unaltered (passband) and blocks other signals (stopband). The signals between the passband and the stopband are signals in the transition band. A low-pass filter allows low-frequency (defined by the filter parameters) to pass. A high-pass filter allows high-frequency signals to pass. A band-pass filter allows frequencies to pass that are at some defined frequency, and a band-reject filter prevents certain signals from passing.

A recursive or non-recursive filter may be utilized in an embodiment of the present invention. A non-recursive or finite impulse response (FIR) filter utilizes only current input values for calculating an output value. A non-recursive filter does not use previous output values from the filter in computing the current output. In contrast, a recursive or infinite impulse response (IIR) filter utilizes both current input values and past output values in calculating the current output value. In one embodiment, the filter performs as a sliding window, placing more weight on recent values than on previous values.

A digital filter has order. The order of a non-recursive digital filter is equal to the number of previous input values used in the current calculation. The order of a recursive digital filter is the greater of either the number of (i) previous input values and (ii) previous output values that are used in the current output calculation. A non-recursive filter can be a zero order filter. A recursive filter must by definition be at least a first order filter.

In the embodiment shown in FIG. 3, the speed at which the finger is moving over the surface of the touchpad (102), i.e., the change in X and Y position on the touchpad (102) per cycle ($s=\sqrt{(\Delta X)^2+(\Delta Y)^2}$), is also filtered and then compared against a maximum speed threshold. Until the speed falls below the maximum speed threshold, the processor (106) will not recognize a press.

In the embodiment shown in FIG. 3, a processor (106) executing program code first compares the pseudo pressure to an upper threshold value 302. If the pseudo pressure exceeds the upper threshold value, the process continues at step 314. If not, the processor (106) determines whether the user was previously touching, for example by checking the value of a stored flag 304. If so, the processor (106) compares the pseudo pressure to a lower threshold value 306. If the user was not previously touching or if the pseudo pressure is equal to or below the lower threshold, the processor (106) determines whether the first tick counter has elapsed 308.

If the first tick counter has elapsed, the process resumes at step 302. If the tick counter has not elapsed, then the processor (106) concludes that the user is tapping 310. The processor (106) clears the first tick count, and the process returns to step 302.

At step 302, if the processor (106) determines that the pseudo pressure exceeds the upper threshold, the processor (106) determines whether the user was previously touching 314. If so, the processor (106) bypasses step 316 and concludes that the user is touching 318. If the user was not previously touching at step 314, the processor (106) starts the first tick counter 316 and concludes that the user is touching 318. If the pseudo pressure is greater than the lower threshold 306 and the user was previously touching 304, the processor (106) restarts the tick count 316.

In any event, in the embodiment shown, once the processor (106) concludes that the user is touching 318, the processor (106) compares the speed to a speed threshold value 320. If the speed is greater than or equal to the speed threshold, the processor (106) returns to step 302 in the process. In comparing the speed to the speed threshold, the processor (106) may determine that although the user is exerting enough pressure to signify a press, because the finger is moving across the touchpad (102), the user does not intend for a press to be recognized.

If the speed is less than the speed threshold, the change in pseudo pressure is compared to a threshold value 322. If the change in pseudo pressure is less than or equal to the threshold, the processor (106) returns to step 302 in the process. If the change in pseudo pressure is greater than the threshold, the processor (106) determines whether the first interval has elapsed 324. If so, the processor (106) concludes that the user is pressing 326 and the processor (106) returns to step 302 in the process.

Embodiments of the invention may use filtering to reduce the effects of unwanted noise. In one such embodiment, three variables are filtered: (1) the speed at which the finger moves across the surface of the touchpad (102), (2) the pseudo-pressure (Z), and (3) the change in pseudo-pressure (Δ Z). The filtering of each of the above quantities may be performed using the same type of filter or different types of filters. For example, in one embodiment, the quantities are filtered using a low-pass first-order recursive digital filter based on the following formula:

$$y(n) = \frac{x(n) + (N-1)y(n)}{N} \qquad \text{[Equation 1]}$$

N is a parameter affecting the cut-off frequency of the filter. For example, in one embodiment, N is set to 10 in filtering speed and pseudo pressure, and N is set to 5 in filtering the change in pseudo-pressure. These values are related to the sampling frequency of the touchpad (102), which, in the embodiment shown, is about 80 Hz. Such a filter computes a rolling average using a weighting function emphasizing more recent samples. This filter requires minimal computational and storage requirements.

In one embodiment, the following thresholds are used to detect finger presses:

TABLE 1

| Variable | Threshold |
|---|---|
| S | 32 |
| Z | lower = 16 |
|   | upper = 32 |
| ΔZ | User-dependent and location-dependent. Thresholds typically range from 2 to 8. |

Ramp type filters work very well in filtering out unwanted noise. However, various types of filters, utilizing a variety of waveforms, a combination of filters, and other processing means may be used as part of a process for determining a user's intent. In one embodiment, the change in pseudo pressure is computed by subtracting the filtered (average) pseudo pressure from the current pseudo pressure. In another embodiment, the previous filtered pseudo pressure is subtracted from the current filtered pseudo pressure.

Figure 4:
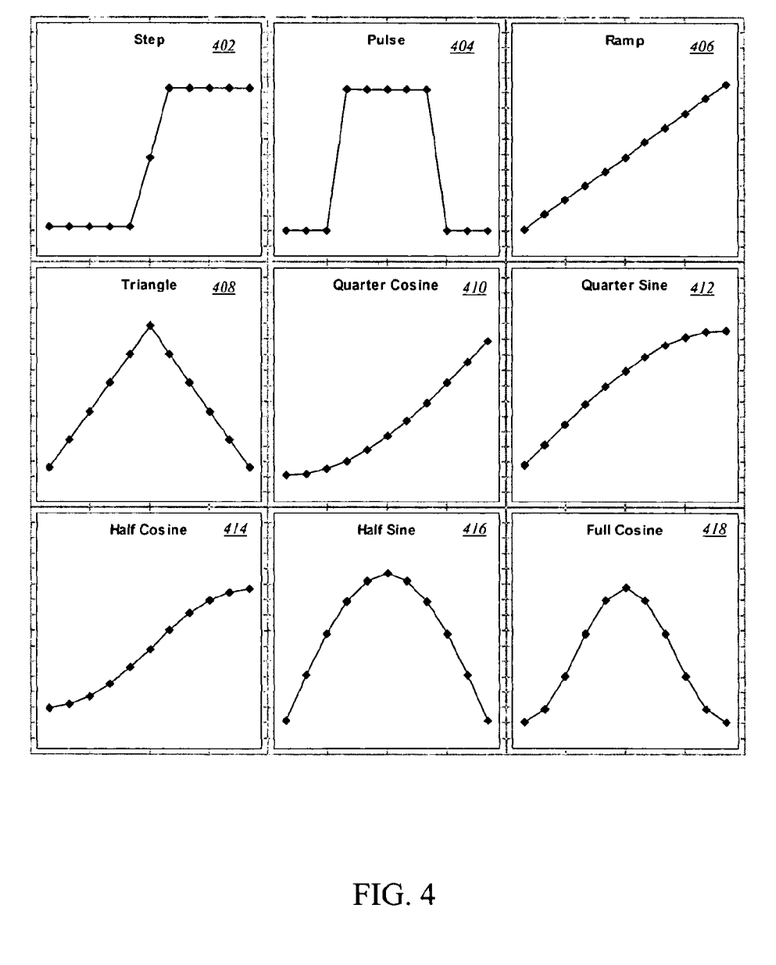
FIG. 4 is a group of charts illustrating various filters that may be utilized in embodiments of the present invention.

In one embodiment, the user adjusts the threshold values for each key to attain maximum accuracy in intent determination. In another embodiment, the threshold is based on the standard deviation of the pseudo-pressure change. In yet another embodiment, more sophisticated filtering techniques are utilized. FIG. 4 is a group of charts illustrating various filters that may be utilized in embodiments of the present invention. The following table provides the waveforms used for each filter shown:

TABLE 2

| Reference | Waveform | Formula |
|---|---|---|
| 402 | Step | $\lambda(n) = \begin{cases} 1, & n < N/2 \\ 0, & n = N/2 \\ -1, & n > 2 \end{cases}$ |
| 404 | Pulse | $\lambda(n) = \begin{cases} -1, & n < N/4, n > 3N/4 \\ 0, & n = N/4, n = 3N/4 \\ 1, & n/4 < n < 3N/4 \end{cases}$ |
| 406 | Ramp | $\lambda(n) = 1 - 2n/N$ |
| 408 | Triangle | $\lambda(n) = \begin{cases} 4n/N - 1, & n \leq N/2 \\ 3 - 4n/N, & n > N/2 \end{cases}$ |
| 410 | Quarter Cosine | $\lambda(n) = -\sin(\pi n/2N)$ |
| 412 | Quarter Sine | $\lambda(n) = \cos(\pi n/2N)$ |
| 414 | Half Cosine | $\lambda(n) = \cos(\pi n/N)$ |
| 416 | Half Sine | $\lambda(n) = \sin(\pi n/N)$ |
| 418 | Full Cosine | $\lambda(n) = -\cos(2\pi n/N)$ |

In various embodiments, the coefficients of these waveforms are further biased so their average is zero and scaled so the sum of the positive coefficients is one. More formally, the filter coefficients a(n) are computed from the above coefficients λ(n) by the following equations:

$$\beta = \frac{1}{N+1} \sum \lambda(n) \quad \text{[Equation 2]}$$

$$v(n) = \lambda(n) - \beta \quad \text{[Equation 3]}$$

$$\rho(n) = \begin{cases} v(n), & v(n) > 0 \\ 0, & v(n) \leq 0 \end{cases} \quad \text{[Equation 4]}$$

$$\mu = \sum \rho(n) \quad \text{[Equation 5]}$$

$$a(n) = \frac{\rho(n)}{\mu} \quad \text{[Equation 6]}$$

where:
B is the bias among λ(n),
N(n) are the unbiased coefficients,
P(n) are the positive coefficients extracted from v(n),
M is the sum of the positive coefficients, and
A(n) are the final filter coefficients.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A method comprising:
   receiving a pressure signal indicating a pressure from an input device;
   determining a change in pressure based at least in part on the pressure signal;
   determining a velocity associated with the pressure signal; and
   outputting a press signal if the velocity is less than a velocity threshold, the change in pressure is greater than a change in pressure threshold, and a first interval has elapsed.

2. The method of claim 1, wherein the pressure signal comprises a pseudo pressure signal.

3. The method of claim 1, further comprising applying a pressure filter to the pressure signal to create a filtered pressure signal.

4. The method of claim 3, wherein the pressure filter comprises a first pressure filter comprising a first attribute, and further comprising applying a second pressure filter to the pressure signal, the second pressure filter comprising a second attribute that is different than the first attribute.

5. The method of claim 4, wherein the first attribute comprises a first frequency value and the second attribute comprises a second frequency value.

6. The method of claim 5, wherein the second frequency value is lower than the first frequency value.

7. The method of claim 3, wherein applying the pressure filter comprises applying the pressure filter utilizing a sliding window.

8. The method of claim 1, wherein the input device comprises one of a touchpad, a touch panel, and a touch screen.

9. The method of claim 1, wherein the pressure signal comprises a first pressure signal and further comprising:
   receiving a second pressure signal indicating a second pressure from the input device;
   calculating a difference signal indicative of a difference between the first pressure signal and the second pressure signal;
   comparing the difference signal to a difference threshold value; and
   outputting the press signal if the difference signal is greater than the difference threshold value.

10. The method of claim 9, further comprising filtering the difference signal to create a filtered difference signal.

11. The method of claim 1, further comprising outputting a signal associated with a haptic effect, the haptic effect based at least in part on the pressure signal.

12. The method of claim 1, further comprising:
determining a rate of change of pseudo-pressure associated with the pressure signal;
comparing the rate of change of pseudo-pressure with a pseudo-pressure threshold; and
outputting a press signal if the rate of change of pseudo-pressure is greater than the pseudo-pressure threshold.

13. The method of claim 1, further comprising comparing the pressure signal to an adaptive pressure threshold value, and outputting the press signal if the pressure signal is greater than the adaptive pressure threshold value.

14. The method of claim 13, wherein the adaptive pressure threshold value is associated with an absolute pressure threshold.

15. The method of claim 13, wherein the adaptive pressure threshold value is associated with a position received from the input device.

16. The method of claim 13, wherein the adaptive pressure threshold value can vary over time.

17. The method of claim 13, wherein the adaptive pressure threshold value is associated with a user identifier.

18. A computer-readable medium on which is encoded programming code, comprising:
program code for receiving a pressure signal indicating a pressure from an input device;
program code for determining a change in pressure based at least in part on the pressure signal;
program code for determining a velocity associated with the pressure signal; and
program code for outputting a press signal if the velocity is less than the velocity threshold, the change in pressure is greater than a change in pressure threshold, and a first interval has elapsed.

19. The computer-readable medium of claim 18, further comprising program code for applying a pressure filter to the pressure signal to create a filtered pressure signal.

20. The computer-readable medium of claim 19, wherein the pressure filter comprises a first pressure filter comprising a first attribute, and further comprising program code for applying a second pressure filter to the pressure signal, wherein the second pressure filter comprises a second attribute that is different than the first attribute.

21. The computer-readable medium of claim 19, wherein program code for applying the pressure filter comprises program code for applying the pressure filter utilizing a sliding window.

22. The computer-readable medium of claim 18, wherein the pressure signal comprises a first pressure signal and further comprising:
program code for receiving a second pressure signal indicating a second pressure from the input device;
program code for calculating a difference signal indicative of a difference between the first pressure signal and the second pressure signal;
program code for comparing the difference signal to a difference threshold value; and
program code for outputting the press signal if the difference signal is greater than the difference threshold value.

23. The computer-readable medium of claim 22, further comprising program code for filtering the difference signal to create a filtered difference signal.

24. The computer-readable medium of claim 18, further comprising program code for outputting a signal associated with a haptic effect, the haptic effect based at least in part on the pressure signal.

25. The computer-readable medium of claim 18, further comprising:
program code for determining a rate of change of pseudo-pressure associated with the pressure signal;
program code for comparing the rate of change of pseudo-pressure with a pseudo-pressure threshold; and
program code for outputting a press signal if the rate of change of pseudo-pressure is greater than the pseudo-pressure threshold.

26. The computer-readable medium of claim 18, further comprising program code for comparing the pressure signal to an adaptive pressure threshold value, and program code for outputting the press signal if the pressure signal is greater than the adaptive pressure threshold value.

* * * * *

UNITED STATES PATENT AND TRADEMARK OFFICE
CERTIFICATE OF CORRECTION

| | | |
|---|---|---|
| PATENT NO. | : 8,164,573 B2 | Page 1 of 1 |
| APPLICATION NO. | : 10/723778 | |
| DATED | : April 24, 2012 | |
| INVENTOR(S) | : Henry DaCosta et al. | |

It is certified that error appears in the above-identified patent and that said Letters Patent is hereby corrected as shown below:

Title page 3, item [56], Line 62, Please delete "Vwiker," please insert -- Wiker, --.

Column 8, Line 45, Please delete "(A Z)", please insert -- ($\Delta$ Z) --.

Signed and Sealed this
Twenty-seventh Day of November, 2012

David J. Kappos
*Director of the United States Patent and Trademark Office*